(12) United States Patent
Kawai (10) Patent No.: US 10,175,675 B2
(45) Date of Patent: Jan. 8, 2019

(54) MACHINE TOOL SYSTEM (71) Applicant: MURATA MACHINERY, LTD., Kyoto-shi, Kyoto (JP)

(72) Inventor: Hidetsugu Kawai, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 108 days.

(21) Appl. No.: 15/316,248

(22) PCT Filed: May 8, 2015

(86) PCT No.: PCT/JP2015/063342
§ 371 (c)(1),
(2) Date: Dec. 5, 2016

(87) PCT Pub. No.: WO2015/190193
PCT Pub. Date: Dec. 17, 2015

(65) Prior Publication Data
US 2017/0139397 A1 May 18, 2017

(30) Foreign Application Priority Data

Jun. 10, 2014 (JP) ................................. 2014-119436

(51) Int. Cl.
| | |
|---|---|
| *G05B 19/404* | (2006.01) |
| *G05B 19/409* | (2006.01) |
| *H04Q 9/00* | (2006.01) |
| *G08C 17/02* | (2006.01) |

(52) U.S. Cl.
CPC ......... *G05B 19/404* (2013.01); *G05B 19/409* (2013.01); *G08C 17/02* (2013.01); *H04Q 9/00* (2013.01); *G05B 2219/36159* (2013.01); *G05B 2219/37582* (2013.01); *G08C 2201/30* (2013.01)

(58) Field of Classification Search
CPC ................... G05B 19/404; G05B 2219/37582
See application file for complete search history.

(56) References Cited

U.S. PATENT DOCUMENTS

| | | | | |
|---|---|---|---|---|
| 2004/0030919 A1* | 2/2004 | Moriya | ................... | B60R 25/24 726/35 |
| 2007/0067059 A1* | 3/2007 | Travez | ................... | B23Q 15/12 700/160 |
| 2008/0058993 A1* | 3/2008 | Tain | ................. | G05B 19/41845 700/275 |

(Continued)

FOREIGN PATENT DOCUMENTS

| | | |
|---|---|---|
| CN | 103049774 A | 4/2013 |
| JP | 2013-222381 A | 10/2013 |
| WO | 2013/094366 A1 | 6/2013 |

OTHER PUBLICATIONS

English translation of Official Communication issued in corresponding International Application PCT/JP2015/063342, dated Aug. 4, 2015.

*Primary Examiner* — Vincent H Tran (74) *Attorney, Agent, or Firm* — Keating & Bennett, LLP (57) ABSTRACT

A machine tool system includes a portable operation terminal capable of operating an industrial machine by wireless communication and including a terminal body including an external connector that is able to receive image information about an image and a communicator that is able to transmit the image information received by the external connector.

2 Claims, 7 Drawing Sheets (56) References Cited

U.S. PATENT DOCUMENTS

| | | | |
|---|---|---|---|
| 2011/0222980 A1* | 9/2011 | Kuo | B23Q 11/0039 409/80 |
| 2013/0041504 A1* | 2/2013 | Kubota | G05B 19/409 700/246 |
| 2014/0230706 A1* | 8/2014 | Suzuki | D05B 19/12 112/102.5 |
| 2014/0231507 A1* | 8/2014 | O'Brien et al. | G06Q 10/06 235/375 |
| 2015/0151363 A1* | 6/2015 | Backhouse | B23Q 9/02 82/134 |

* cited by examiner

|    | X  | Y  | Z  |
|----|----|----|----|
| P1 | X1 | Y1 | Z1 |
| P2 | X2 | Y2 | Z2 |
| P3 | X3 | Y3 | Z3 |
| ⋮  | ⋮  | ⋮  | ⋮  |

MACHINE TOOL SYSTEM

BACKGROUND OF THE INVENTION

1. Field of the Invention

The present invention relates to an operation terminal, a machine tool system, and a method for operating an industrial machine.

2. Description of the Related Art

There are industrial machines including a loader that carries a workpiece, a machine tool that machines the workpiece, and a controller that controls the loader and a machining device. Such an industrial machine is typically operated under the automatic control of the controller, but it may be manually operated, for example, when teaching or the like is performed on the loader. There is known an operation terminal that when manually operating a loader, the operator is able to carry so that the operator is able to check the operating area of the loader nearby (for example, see Japanese Unexamined Patent Application Publication No. 2013-222381). According to Japanese Unexamined Patent Application Publication No. 2013-222381, the operation terminal and industrial machine (loader) communicate to each other operation information to operate the industrial machine.

Recently, there has been required a configuration in which an operation terminal and an industrial machine are able to communicate operation information, as well as, for example, large-size information such as image information, to each other. Not only industrial machines of the above type but also those of other types such as industrial robots are required to have a similar configuration. However, Japanese Unexamined Patent Application Publication No. 2013-222381 does not conceive of the communication of information different from operation information between the operation terminal and the industrial machine and therefore has difficulty in transmitting and receiving, for example, large-size information.

SUMMARY OF THE INVENTION

In view of the foregoing, preferred embodiments of the present invention provide a machine tool system including an operation terminal that is able to communicate, with an industrial machine, information different from information used to operate the industrial machine.

A machine tool system according to a preferred embodiment of the present invention includes a machine tool that machines a workpiece, a loader that carries the workpiece in and out of the machine tool by moving a workpiece support that supports the workpiece, an identifier disposed in a reference position of the machine tool to which the workpiece support is able to move, a portable operation terminal that is able to operate at least one of the machine tool and the loader by wireless communication and includes a detector that detects identification information about the identifier and a communicator that transmits the identification information detected by the detector, and a position setter that sets a stop position or a passage position of the workpiece support on the basis of position information of the workpiece support recognized on the basis of the identification information transmitted from the communicator.

According to preferred embodiments of the present invention, the terminal body and industrial machine communicate with each other wirelessly and therefore are able to use a communication system capable of transmitting and receiving large-size data. By using such a communication system, the terminal body is able to quickly and reliably transmit even information, such as image information, different from information to operate the industrial machine to the industrial machine. Since there is no need for a wire to connect the terminal body and industrial machine and thus the terminal body is able to be made wireless or cordless, the movement range of the operator is not limited by a wire when the operator moves with the terminal body. That is, the movement range of the operator carrying the terminal body is expanded.

If the terminal body is provided with an imager that captures image information, the operator is able to capture image information by operating the terminal body. Thus, the operator is able to save the time and effort to attach and detach an external image capture device to and from the terminal body. Further, the operator is able to easily move even to a position remote from the industrial machine, a position behind the industrial machine, or other positions and to acquire an image. If the terminal body is provided with a display that displays an image based on image information, the operator is able to check an image to be transmitted, on the terminal body. If the terminal body is provided with an illuminator that emits illumination light, the operator is able to illuminate a dark, difficult-to-see area and to make the area easy to see.

In the case of the operation terminal of a preferred embodiment of the present invention, the terminal body wirelessly communicates with the industrial machine and therefore is able to use a communication system capable of transmitting and receiving large-size data. By using such a communication system, the terminal body is able to quickly and reliably transmit even information, such as information about an identifier, different from information to operate the industrial machine to the industrial machine. Further, the terminal body is able to be cordless or wireless, and therefore the operator is able to freely move the terminal body in accordance with the position of the identifier.

A machine tool system according to a preferred embodiment of the present invention uses the operation terminal which is able to quickly and reliably transmit even information different from operation information to operate at least one of the loader and machine tool. Thus, the machine tool system is able to acquire much information. Further, if the identifier is disposed in a reference position in the machine tool to which the workpiece support is able to move and if identification information about the identifier is detected by the detector of the operation terminal, the operation terminal is able to quickly and reliably transmit the identification information to the machine tool system. Furthermore, the machine tool system sets the stop position or passage position of the workpiece support on the basis of the position information of the workpiece support recognized on the basis of the identification information. Thus, the machine tool system is able to easily perform this setting work.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Now, preferred embodiments of the present invention will be described with reference to the drawings. However, the present invention is not limited thereto. To clarify the preferred embodiments, the drawings are scaled, for example, partially enlarged or highlighted, as necessary. The present preferred embodiment provides a method for operating an industrial machine using a portable operation terminal by wireless communication. The method includes inputting image information about an image to the operation terminal or detecting information about an identifier disposed in a predetermined position using the operation terminal and transmitting the inputted image information or the detected information about the identifier from the operation terminal.

Figure 1A:
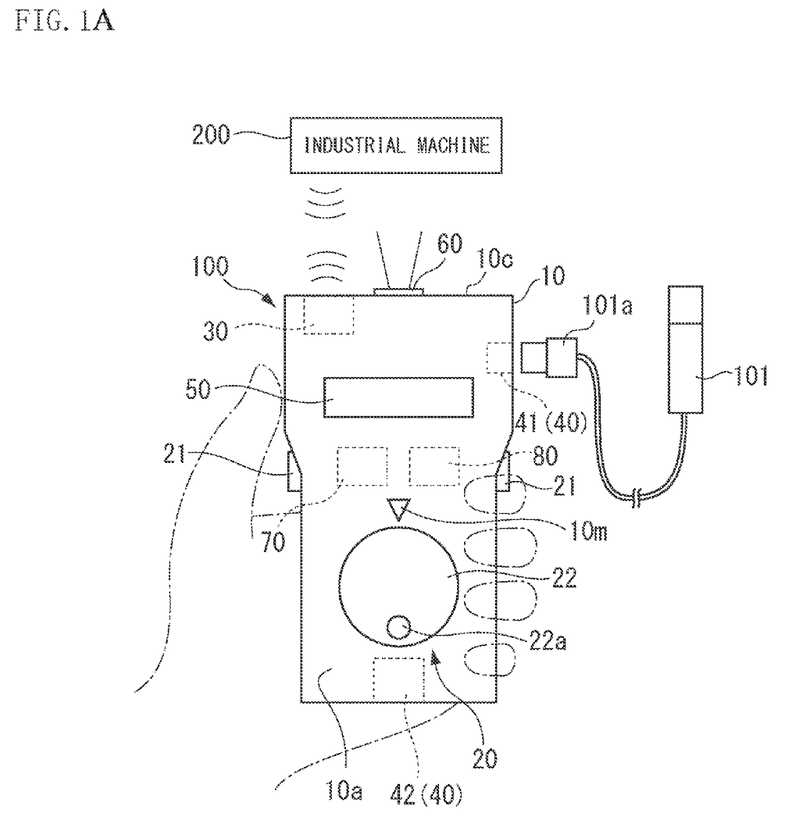
FIGS. 1A and 1B are diagrams showing an example of an operation terminal according to a preferred embodiment of the present invention.
Figure 1B:
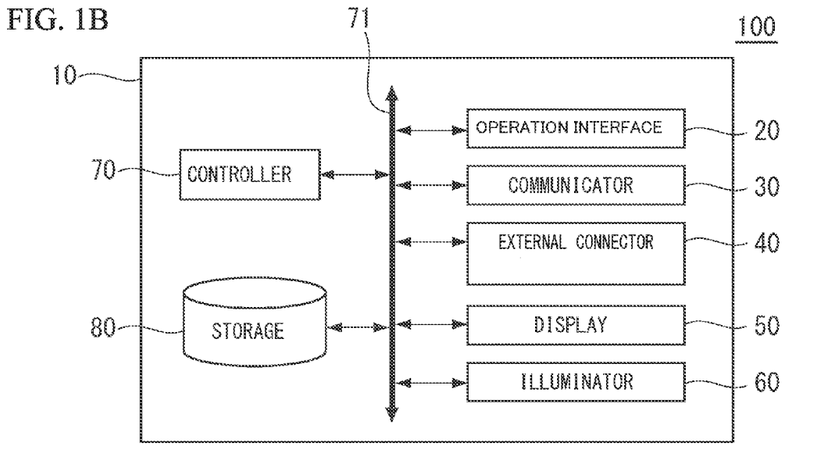

FIG. 1A is a diagram showing an example of an operation terminal 100 of the present preferred embodiment. FIG. 1B is a block diagram showing an example of the operation terminal 100.

The operation terminal 100 is a portable operation terminal that is able to wirelessly communicate with an industrial machine 200 (see FIG. 1A) and that allows the operator to operate the industrial machine 200 by wireless communication. The industrial machine 200 is, for example, a machine tool that machines a predetermined workpiece. The industrial machine 200 includes, for example, a loader that carries a workpiece, a machining apparatus that cuts the workpiece, an operation panel to directly operate the industrial machine 200, and a controller configured or programmed to centrally control the industrial machine 200.

The operation terminal 100 includes a terminal body 10 with a size and shape that allow the operator to hold the terminal body 10 with one hand. The terminal body 10 is provided with an operation interface 20, a communicator 30, an external connector 40, a display 50, an illuminator 60, a controller 70, and a storage 80. The terminal body 10 is also provided with a power supply (not shown) that supplies powder to these components. The power supply may be internal or external.

The operation interface 20 selects the operating areas of the terminal body 10 and industrial machine 200 to be operated and operates the selected operating areas. The operation interface 20 includes buttons 21 and a dial 22. The buttons 21 are disposed on the left and right sides of the terminal body 10. The buttons 21 can be operated, for example, by an operator's hand which is holding the terminal body 10. The buttons 21 switch between an operation mode to select the operating areas of the terminal body 10 and industrial machine 200 to be operated (hereafter referred to as a first mode) and an operation mode to operate the selected operating areas (hereafter referred to as a second mode).

The dial 22 is preferably disposed on the front side 10a of the terminal body 10. The dial 22 is able to be operated, for example, by an operator's hand which is not holding the terminal body 10. The dial 22 is provided with a knob 22a. For example, the operator is able to turn the dial 22 while grasping the knob 22a. The dial 22 has a scale (not shown) on the outer circumference thereof. The terminal body 10 also preferably includes an inverted isosceles triangular mark 10m on the front side 10a. By reading a marking corresponding to a position indicated by the peak of the mark 10m (a lower portion of the mark in FIG. 1A), the operator is able to identify the manipulated variable (the amount of turn, the turn angle) of the dial 22. By turning the dial 22 in the first mode, the operator is able to change the selected operating areas of the terminal body 10 and industrial machine 200 to be selected. Also, by turning the dial 22 in the second mode, the operator is able to, for example, adjust the amounts of operation of the selected operating areas.

In addition to the buttons 21 and dial 22, the terminal body 10 may be provided with a rotary switch or the like on the front side. In this case, the rotary switch may be configured so that the operator selects the areas to be operated using the rotary switch.

The communicator 30 wirelessly communicates with an external wireless communicator. For example, the communicator 30 is able to transmit and receive various types of information to and from a wireless communicator (not shown) included in the industrial machine 200. The communicator 30 is, for example, a known wireless module. The wireless communication system used here is a system capable of transmitting data, such as image information, having a larger size than operation information and is, for example, a wireless LAN or optical communication.

The external connector (input interface) 40 has a connector 41 and a card slot 42. A connection terminal 101a of an image capture device 101 is able to be inserted into the connector 41. Examples of the image capture device 101 include devices capable of acquiring image information. Specific examples include microscopes and cameras. As used herein, the term "image information" refers to information about an image and includes data about a still image or a moving image. Image information may include data about a code image, such as a barcode or two-dimensional code (to be discussed later). Image information may also include correction data to correct the hue, chroma, lightness, distortion, or the like of image data, image processing data to perform predetermined processing such as compression or decompression on image data, or the like.

The connector 41 is, for example, a USB connector, or the like. By inserting the connection terminal 101a into the connector 41, the connector 41 is enabled to receive image information acquired by the image capture device 101. The card slot 42 is a slot into which a card-type storage medium, such as a memory card, is inserted. By inserting an external storage medium storing the above image information into the card slot 42, the image information stored in the external storage medium is inputted to the card slot 42. As seen above, the external connector 40 is an input interface that is able to receive image information.

The display 50 displays, for example, the names of operating areas of the operation terminal 100 and industrial machine 200 to be operated. For example, when the operator turns the dial 22 in the first mode, the display 50 is able to change and display the name of the operating area to be selected. The display 50 is, for example, a display device such as a liquid crystal device. The display 50 may be configured to be able to display an image based on image information acquired by the image capture device 101.

The illuminator 60 emits illumination light. While the illuminator 60 is disposed, for example, on an end surface 10c in the length direction, of the terminal body 10, it may be disposed in other positions of the terminal body 10. The illuminator 60 is, for example, a light-emitting device such as a high-luminance LED.

The illuminator 60 may be configured to be able to adjust the output (brightness) of illumination light. In this case, the illuminator 60 may be configured so that the output thereof is changed when the operator sets the operation mode of the operation interface 20 to the second mode and then turns the dial 22. The illuminator 60 may also be configured so that the output of illumination light is constant.

The controller 70 is configured or programmed to centrally control the components. The controller 70 includes, for example, a central processing unit (CPU) defining an arithmetic unit and is connected to the components through a data bus 71. The controller 70 is configured or programmed to transmit a command, the result of an arithmetic operation performed by the arithmetic unit, information read from the storage 80, or the like to the components through the data bus 71. The controller 70 is configured or programmed to control the transmission and reception of information by the communicator 30, the connection destination of the communicator 30 in wireless communication, and the like. For example, the controller 70 is able to control the communicator 30 so that the communicator 30 transmits, to the industrial machine 200, image information inputted to the external connector 40. The controller 70 may be able to automatically recognize the connection destination of the communicator 30 in wireless communication. The controller 70 is also able to control, through the external connector 40, an external device connected to the external connector 40. The controller 70 is also able to control content displayed on the display 50, the timings when the illuminator 60 lights up and goes out, and the like.

The storage 80 stores various types of information, including programs and data used by the controller 70 to perform control. Examples of the information stored in the storage 80 include information about the communication destination of the communicator 30. Examples of the communication destination of the communicator 30 include the industrial machine 200, as well as a computer (not shown) of a management center that manages the industrial machine 200. The storage 80 also stores information about the name or the like of the area to be operated, and so on. The storage 80 may store the above image information, and the controller may control the communicator 30 so that the communicator 30 transmits image information stored in the storage 80 to the industrial machine 200. In this case, the storage 80 defines and functions as an input interface to which image information is able to be inputted.

In the operation terminal 100 thus configured, when the connection terminal 101a of the image capture device 101, such as a microscope, is connected to the connector 41 of the external connector 40, image information about an image captured by the image capture device 101 is inputted to the external connector 40 (connector 41). The controller 70 is configured or programmed to control the communicator 30 so that the communicator 30 transmits the inputted image information to the industrial machine 200.

As seen above, according to the present preferred embodiment, the terminal body 10 wirelessly communicates with the industrial machine 200 and therefore is able to use a communication system capable of transmitting and receiving large-size data. By using such a communication system, the terminal body 10 is able to quickly and reliably transmit even information, such as image information, different from information to operate the industrial machine 200 to the industrial machine 200.

Since there is no need for a wire to connect the terminal body 10 and industrial machine and thus the terminal body 10 is able to be cordless or wireless, the movement range of the operator is not limited by a wire when the operator moves with the terminal body. That is, the movement range of the operator carrying the terminal body 10 is expanded.

Also, the operator connects the image capture device 101 to the cordless terminal body 10 and then captures an image and therefore the movement of the operator is not limited by a wire. The operator is able to easily move even to a position remote from the industrial machine 200, a position behind the industrial machine 200, or other positions and to acquire an image. Further, after capturing an image, the operator is able to detach the image capture device 101 from the terminal body 10 and therefore is able to reduce the load when carrying the terminal body 10.

Figure 2:
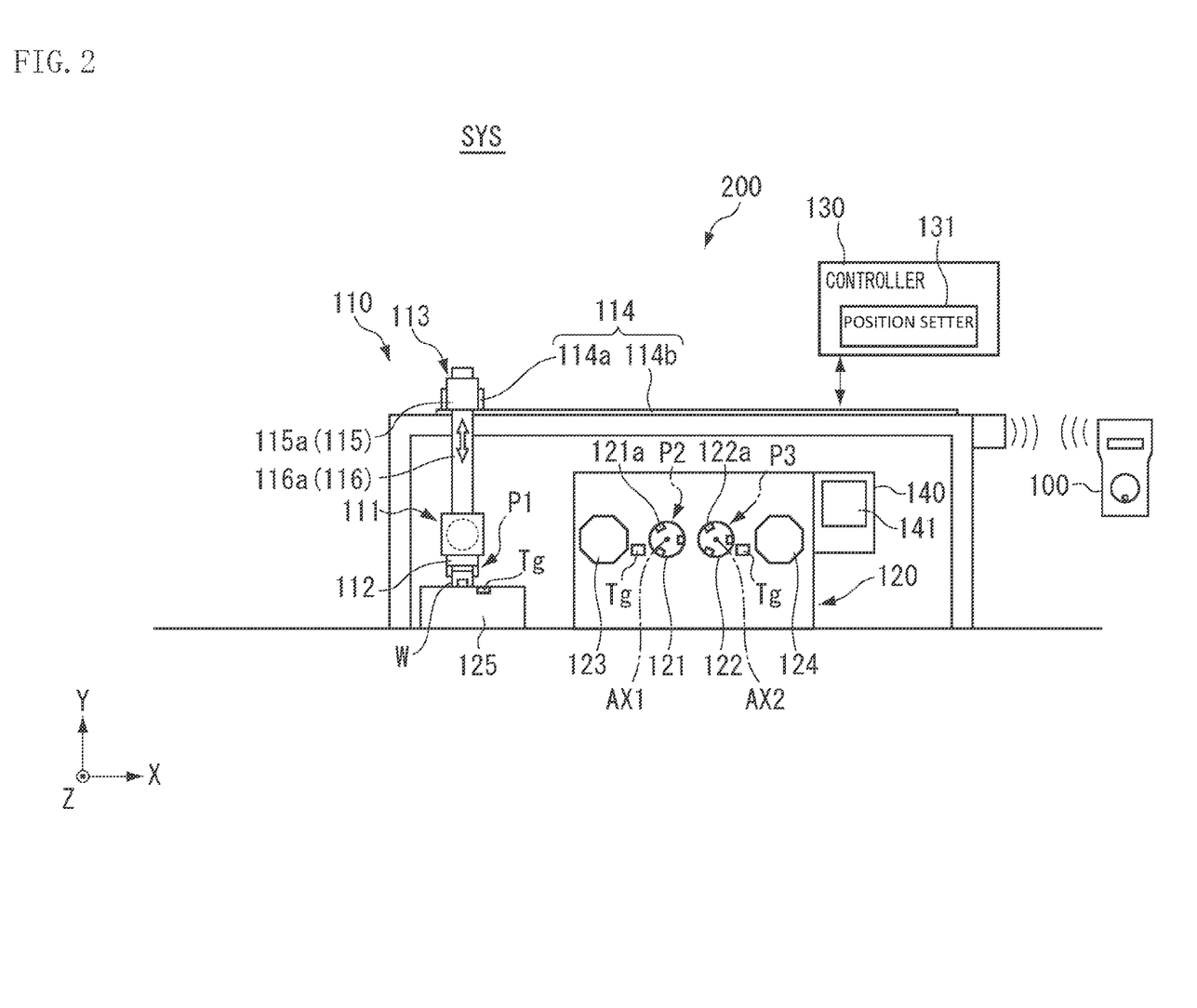
FIG. 2 is a diagram showing an example of a machine tool system according to a preferred embodiment of the present invention.

Next, a machine tool system SYS according to another preferred embodiment of the present invention will be described. The directions in the figure will be described below using an XYZ coordinate system. In the XYZ coordinate system, a plane parallel with the horizontal plane is defined as an XZ plane; the direction of main spindles (main spindles 121, 122 to be discussed later) parallel with the XZ plane is defined as a Z direction; a direction perpendicular to the Z direction (a direction determining the amount of cutting of a workpiece W) is defined as an X direction; and a direction perpendicular to the XZ plane is defined as a Y direction. In the figure, directions shown by arrows are the positive directions of the X, Y, and Z directions, and opposite directions are the negative directions thereof.

FIG. 2 is a diagram showing an example of the machine tool system SYS. The machine tool system SYS includes an industrial machine 200 and an operation terminal 100 to operate the industrial machine 200. FIG. 2 shows an example of the machine tool system SYS seen from the positive Z side. In FIG. 2, the front side of the machine tool system SYS is located on the positive Z side, and the back side thereof is located on the negative Z side. The lateral sides of the machine tool system SYS are located on the positive and negative X sides, and the X direction represents the horizontal direction of the machine tool system SYS. As shown in FIG. 2, the industrial machine 200 includes a loader 110, a machine tool 120, a controller 130, and an operation panel 140.

The loader 110 includes a loader head 111 and a loader driver 113. For example, the loader 110 carries the workpiece W between the main spindles 121 and 122 (to be discussed later) and a workpiece carrier 125. The loader head 111 includes a loader chuck 112. The loader chuck 112 grasps the workpiece W using multiple grasping nails. For example, the loader chuck 112 is able to move in a posture in which it directs the grasped workpiece W in the negative Y direction and in a posture in which it directs the grasped workpiece W in the negative Z direction (a posture in which it directs the workpiece W toward the main spindles 121 and 122, to be discussed later). The loader 110 may include multiple loader chucks 112.

The loader driver 113 includes an X driver 114, a Z driver 115, and a Y driver 116. The X driver 114 includes an X moving body 114a and a guide rail 114b. The X moving body 114a is configured to be able to be moved along the guide rail 114b in the X direction by a drive source (not shown). The Z driver 115 is provided on the X moving body 114a. The Z driver 115 includes a Z moving body 115a. The Z moving body 115a is able to be moved along a guide (not shown) in the Z direction by a drive source (not shown). The Y driver 116 is formed on the Z moving body 115a. The Y driver 116 includes a Y moving body 116a. The Y moving body 116a is able to be moved along a guide (not shown) in the Y direction by a drive source (not shown).

The loader head 111 is disposed under the Y moving body 116a. When the X driver 114, Z driver 115, and Y driver 116 drive the loader head 111, the workpiece W grasped by the loader chuck 112 of the loader head 111 is carried in the X direction, Y direction, Z direction, or a combined direction thereof. The drive of the loader 110 thus configured is controlled by the controller 130 (to be discussed later).

The machine tool 120 is, for example, a parallel biaxial lathe. The machine tool 120 includes the main spindles 121 and 122, turrets 123 and 124, and the workpiece carrier 125. The main spindles 121 and 122 are disposed side by side in the X direction and are rotated around central axes AX1 and AX2, respectively, by drivers (not shown). The main spindles 121 and 122 include, on the positive Z side ends thereof, multiple grasping nails 121a and 122a, respectively, that are able to grasp the workpiece W. The turret 123 is disposed on the negative X side of the main spindle 121. The turret 124 is disposed on the positive X side of the main spindle 122.

The turrets 123 and 124 are rotated around shafts parallel with the Z direction by respective drivers (not shown). Multiple cutting tools (not shown) are held on the circumferential surfaces of the turrets 123 and 124, and desired cutting tools are selected by rotating the turrets 123 and 124. The cutting tools include cutting tools for cutting the workpiece W, as well as rotary tools, such as a drill and an end mill. The turrets 123 and 124 are able to be moved, for example, in the X and Z directions with respect to the workpiece W by the drivers (not shown). Note that the number of main spindles 121 and 122 and/or the number of turrets 123 and 124 need not be two and, for example, may be one.

The workpiece carrier 125 has the workpiece W, which is to be machined, placed thereon. The workpiece carrier 125 is, for example, a fixed base, but it is not limited thereto and may be a conveyor, rotary pedestal, or the like. The workpiece carrier 125 may serve also to remove the workpiece, or a removal carrier may be disposed in a position different from the workpiece carrier 125. The drive of the machine tool 120 is controlled by the controller 130 (to be discussed later).

The controller 130 is configured or programmed to centrally control the operation of the loader 110 and machine tool 120 on the basis of a predetermined machining program. The controller 130 may be connected to a higher-order controller or the like (not shown) by wire or wirelessly. In this case, the controller 130 may control the operation of the loader 110 and machine tool 120 on the basis of a program stored in the storage of the higher-order controller. The controller 130 includes a position setter 131. The position setter 131 sets the stop position or passage position of the loader chuck 112 in teaching the loader 110 (to be discussed later).

The operation panel 140 is an operation device of the industrial machine 200 operated by the operator. The operation panel 140 is connected to the controller 130 by wire or wirelessly. The operation panel 140 includes a display 141 such as a liquid crystal display, as well as switches 142. For example, the operator uses the operation panel 140 to perform operations, such as the change of a program and settings of the controller 130.

In the present preferred embodiment, the operation terminal 100 is used to operate the industrial machine 200 and is the operation terminal 100 shown in FIGS. 1A and 1B. The operation terminal 100 is able to operate at least one of the loader 110 and machine tool 120 by wireless communication. The storage 80 of the operation terminal 100 stores information about the components of the industrial machine 200 operated by the operation terminal 100. For example, it stores information about the loader chuck 112, X driver 114, Z driver 115, Y driver 116, and the like of the loader 110.

Next, the operation of the machine tool system SYS will be described. First, the controller 130 locates the loader head 111 of the loader 110 shown in FIG. 2 above (the positive Y side) the workpiece carrier 125 and moves the Y moving body 116a in the negative Y direction with the loader chuck 112 directed downward (in the negative Y direction). The controller 130 then causes the grasping nails to hold the workpiece W previously placed on the workpiece carrier 125.

The controller 130 then directs the loader chuck 112 and workpiece W in the negative Z direction. The controller 130 then causes the Y driver 116 to move the loader head 111 in the positive Y direction so that the loader head 111 is located at a predetermined height. The controller 130 then causes the X driver 114 to move the loader head 111 in the positive X direction so that the loader head 111 and workpiece W are located, for example, above (the positive Y side) the main spindle 121. Hereafter, a case in which the workpiece is placed on the main spindle 121 will be described. Note that if the workpiece W is placed on the main spindle 122, the loader head 111 and workpiece W are located over the main spindle 122.

The controller 130 then moves the Y moving body 116a in the negative Y direction so that the workpiece W faces the main spindle 121. The controller 130 then moves the Z moving body 115a in the negative Z direction and causes the grasping nail 121a of the main spindle 121 to hold the workpiece W. The controller 130 then moves the Z moving body 115a in the positive Z direction and positive Y direction, thereby returning the loader head 111. The controller 130 then causes the machine tool 120 to machine the workpiece W using a tool (not shown) disposed on the turret 123 on the basis of a predetermined machining recipe.

After machining the workpiece W, the controller 130 causes the main spindle 121 to pass the workpiece W to the loader chuck 112. Specifically, first, the controller 130 causes the Y driver 116 to move the Y moving body 116a again in the negative Y direction so that the main spindle 112 faces the workpiece W. The controller 130 then causes the loader head 111 to move in the negative Z direction and causes the grasping nails of the loader chuck 112 to hold the workpiece W. The controller 130 then causes the main spindle 121 to open the grasping nails 121a so that the workpiece W is passed to the loader chuck 112.

After passing the workpiece W, the controller 130 causes the X driver 114, Z driver 115, and Y driver 116 to move the X moving body 114a, Z moving body 115a, and Y moving body 116a in the X direction, Z direction, and Y direction, respectively, so that the workpiece is carried to a predetermined carrying destination, such as a workpiece removal carrier (not shown).

For example, in order to teach the loader 110 in the machine tool system SYS, the operator stops the operation of the industrial machine 200 and manually operates the loader 110. The operator performs this manual operation with the operation terminal 100 while checking the operating area of the loader 110 nearby.

Specifically, first, the operator starts the operation terminal 100 and then selects the area to be operated by setting the operation mode of the operation interface 20 to the first mode and operating the operation interface 20. For example, in order to teach the loader 110 a position (a first position) P1 in which the loader chuck 112 receives the workpiece W, the operator sequentially selects the X driver 114, Z driver 115, and Y driver 116 of the loader 110 and manually performs an operation so that the loader chuck 112 reaches the first position P1.

If the operator selects, for example, the X driver 114 as the area to be operated in this operation, the controller 70 issues a command to the industrial machine 200 so that the X driver 114 operates in accordance with the operation performed on the operation interface 20. This command is wirelessly transmitted to the industrial machine 200 through the communicator 30. The industrial machine 200 wirelessly receives this command and enables the X driver 114 to be manually operated.

Subsequently, the operator operates the buttons 21 to switch the operation mode to the second mode and then turns the dial 22. The controller 70 issues a command to adjust the amount and direction of movement of the X driver 114 in accordance with the amount of turn and turn direction of the dial 22. Note that the following settings are previously made: when the operator turns the dial 22 clockwise, the X moving body 114a is moved in the positive X direction; when the operator turns the dial 22 counterclockwise, the X moving body 114a is moved in the negative X direction. The industrial machine 200 receives the command from the controller 70 and controls the X driver 114 so that an operation corresponding to the command is performed. Similarly, the industrial machine 200 controls the Z driver 115 and Y driver 116 and then moves the loader chuck 112 to the first position P1.

Figure 3A:
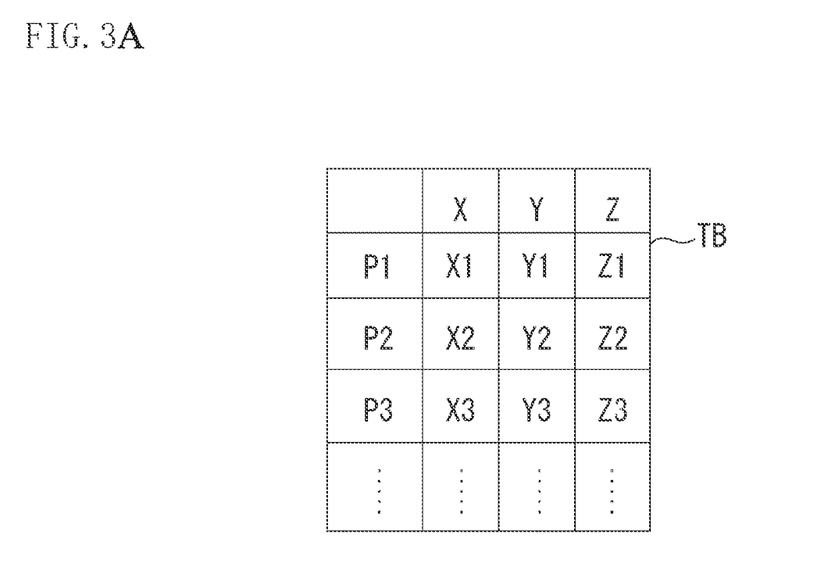
FIG. 3A is a data table showing the coordinates of the teaching position of a loader.

In this state, the operator of the operation terminal 100 or the operator of the industrial machine 200 operates the operation panel 140 to register the X, Z, and Y coordinates of the loader chuck 112 in a storage or the like disposed in the controller 130. Thus, the position setter 131 sets the coordinates of the first position P1 in the industrial machine 200. Subsequently, the operator manually performs similar operations using the operation terminal 100, and the position setter 131 sets the positions of the loader chuck 112 corresponding to respective operations, in the industrial machine 200. Examples of the positions include a second position P2 in which the loader chuck 112 passes the workpiece W to the main spindle 121, a third position P3 in which the loader chuck 112 passes the workpiece W to the main spindle 122, a position in which the workpiece is carried out, and a position in which the loader chuck 112 reverses the workpiece W using a reversing device (not shown) and holds it in a different manner. The set information is stored as a data table TB in a storage (not shown) disposed in the industrial machine 200, for example, as shown in FIG. 3A.

In addition to the above usage, when the operator connects a microscope defining and functioning as the image capture device 101 to the external connector 40 of the operation terminal 100, the operation terminal 100 is able to transfer image information captured by the image capture device 101 to the industrial machine 200. Specifically, image information about an image captured by the operator using the image capture device 101 is inputted to the external connector 40. The controller 70 controls the communicator 30 so that the communicator 30 wirelessly transmits, to the industrial machine 200, the image information inputted to the external connector 40. The transmission of this image information may be automatically performed by the controller 70, or may be performed on the basis of an operation of the operation interface 20 by the operator. Further, the controller 70 may perform the compression of the data to be transmitted, the correction of the image, or other processing.

Figure 3B:
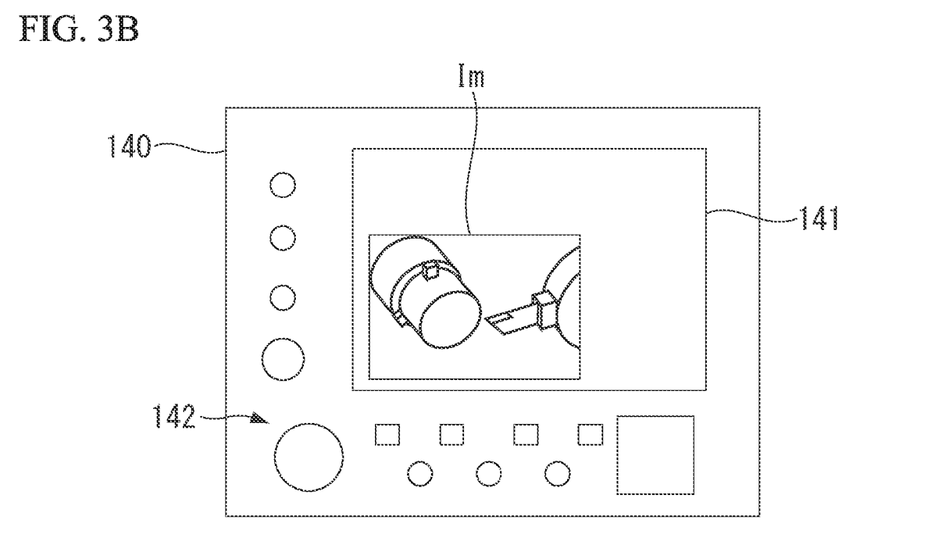
FIG. 3B is a diagram showing a state in which an image is displayed on a display panel.

When the industrial machine 200 receives the image information, the controller 130 is able to cause the display 141 of the operation panel 140 to display an image Im based on the image information, for example, as shown in FIG. 3B. Thus, the operator is able to check the image Im on the display 141. Examples of the image Im include an image of the workpiece W and an image of the front end of a tool that machines the workpiece W. For example, the image Im shown in FIG. 3B represents the workpiece held on the main spindle and a cutting tool that cuts the workpiece. Any of a still image and a moving image may be displayed on the display 141. With regard to a moving image, for example, a recorded moving image may be displayed, or a moving image being captured may be displayed as a live view image. The transfer of the image information need not always be performed while the industrial machine 200 stops a machining operation and may be performed while the industrial machine 200 performs a machining operation. As seen above, the operation terminal 100 is able to wirelessly transmit image information to the industrial machine 200. Thus, the operator is able to check the image information on the display 141 of the industrial machine 200, which is remote from the operation terminal 100.

The operator is also able to illuminate a dark area using the illuminator 60 of the operation terminal 100. In this case, the operator sets the operation mode to the first mode and selects the illuminator 60 as an area to be operated. In accordance with this selection, the controller 70 controls the illuminator 60 so that the illuminator 60 emits illumination light. Subsequently, when the operator operates the buttons 21 to switch the operation mode to the second mode and then turns the dial 22, the controller 70 adjusts the output (brightness) of the illumination light emitted from the illuminator 60 in accordance with the amount of turn of the dial 22.

As seen above, according to the machine tool system SYS of the present preferred embodiment, there is used the operation terminal 100, which is able to quickly and reliably transmit even image information or the like different from operation information to operate the industrial machine 200. Thus, the industrial machine 200 is able to acquire much information. As a result, the machine tool system SYS is able to more efficiently control the operation of the industrial machine 200, such as the machining of the workpiece or the management of tools.

Figure 4A:
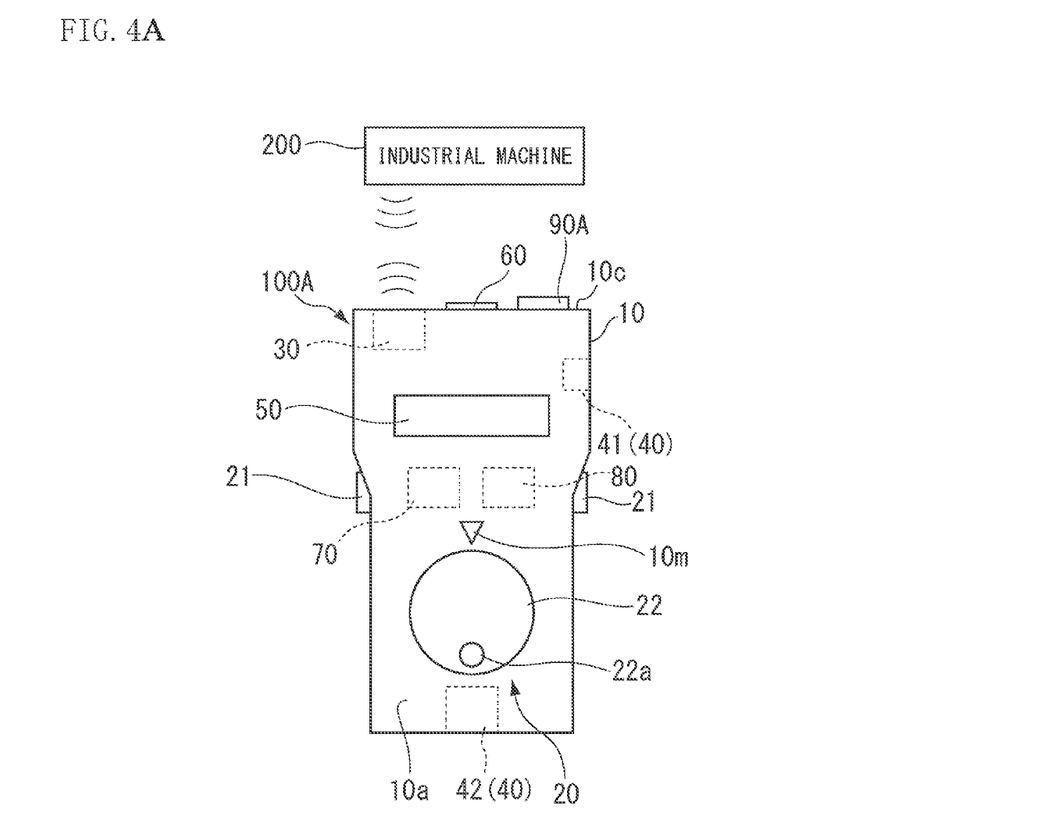
FIGS. 4A and 4B are diagrams showing an example of an operation terminal according to a modification of a preferred embodiment of the present invention.
Figure 4B:
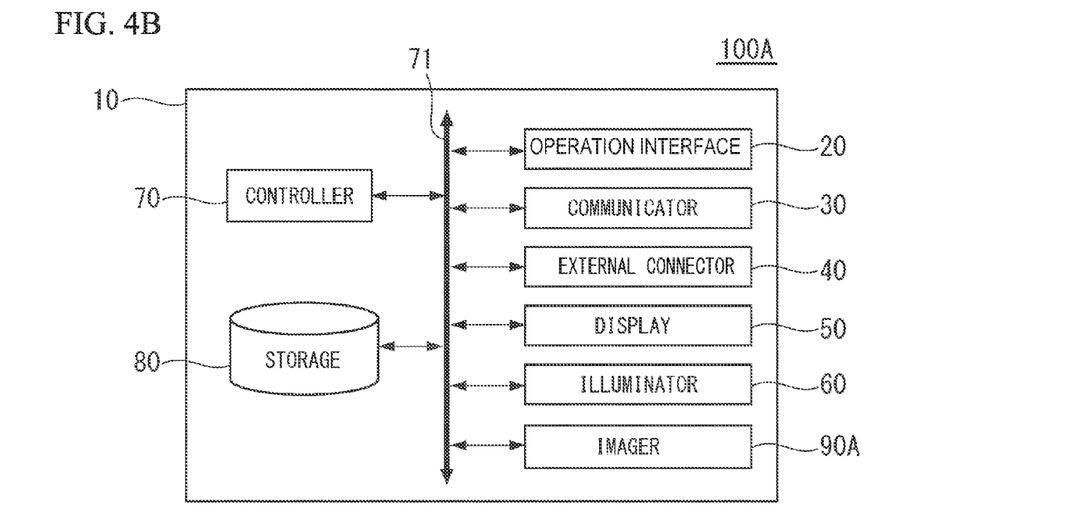

Next, a modification of a preferred embodiment of the present invention will be described. FIG. 4A is a diagram showing an example of an operation terminal 100A. FIG. 4B is a block diagram showing an example of the operation terminal 100A. As shown in FIGS. 4A and 4B, in the present modification, a terminal body 10 of the operation terminal 100A is provided with an operation interface 20, a communicator 30, an external connector 40, a display 50, an illuminator 60, a controller 70, and a storage 80, as well as an imager 90A.

In the above preferred embodiment, image information is acquired using one of the image capture devices 101; and the image information is then inputted to the external connector 40 by connecting this image capture device to the external connector 40. In the present modification, on the other hand, image information is inputted by capturing an image using the imager 90A disposed in a portion of the operation terminal 100A. In this case, the controller 70 is able to control the communicator 30 so that the communicator 30 transmits the image information captured by the imager 90A to an industrial machine 200. Examples of the imager 90A include image capture devices including an image sensor, such as a CCD or CMOS.

As seen above, the terminal body 10 is provided with the imager 90A and thus the operator is able to save the time and effort to attach and detach the image capture device 101 to and from the external connector 40. Also, the disposition of the imager 90A in the terminal body 10 eliminates the need for the operator to carry the image capture device 101 itself, allowing the operability of the terminal body 10 to be secured.

Figure 5A:
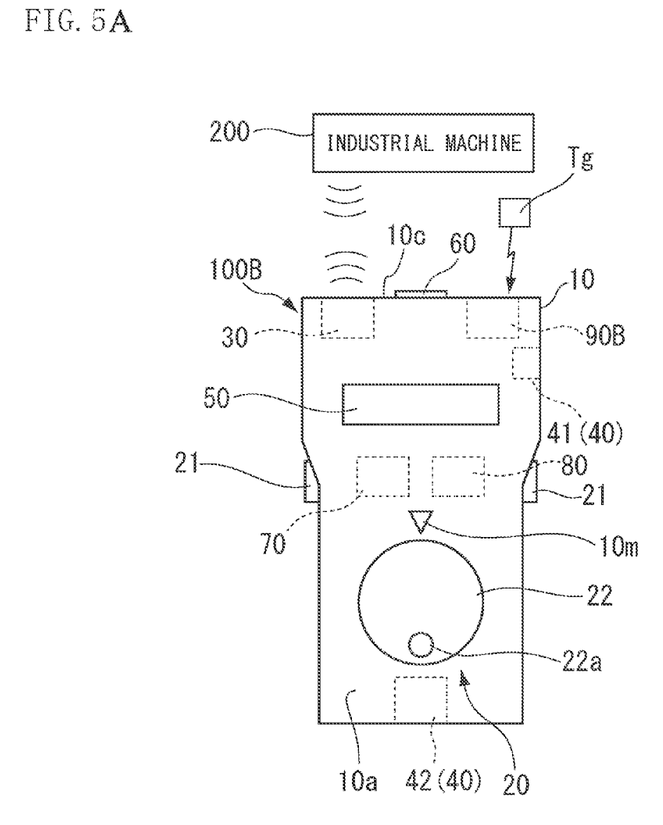
FIGS. 5A and 5B are diagrams showing another example of an operation terminal according to a modification of a preferred embodiment of the present invention.
Figure 5B:
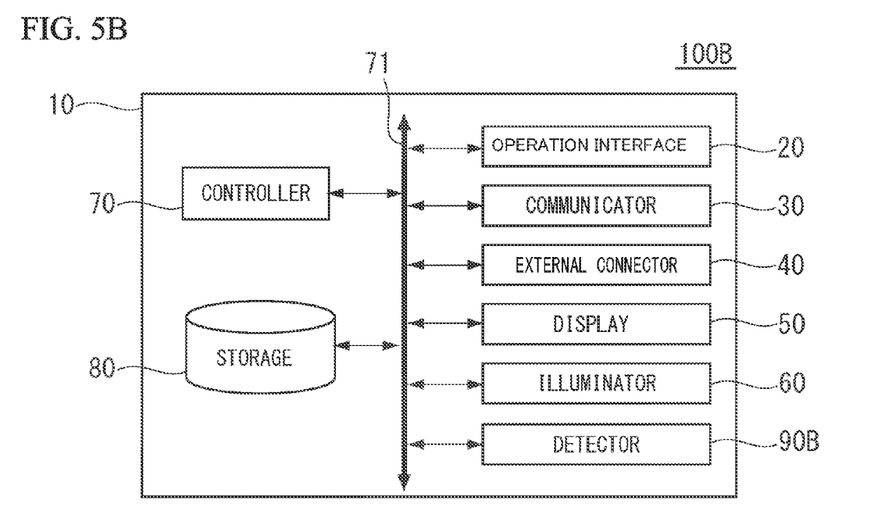

Next, another modification of a preferred embodiment of the present invention will be described. FIG. 5A is a diagram showing an example of an operation terminal 100B. FIG. 5B is a block diagram showing an example of the operation terminal 100B. As shown in FIGS. 5A and 5B, in the present modification, a terminal body 10 of the operation terminal 100B is provided with an operation interface 20, a communicator 30, an external connector 40, a display 50, an illuminator 60, a controller 70, and a storage 80, as well as a detector 90B. The present modification will be described below using, as an example, an industrial machine 200 that includes the loader 110, machine tool 120, controller 130, and operation panel 140 described above.

The detector 90B detects an RF signal from a radio frequency (RF) tag Tg, which is an example of an identifier. The RF tag Tg may be an IC tag, non-contact IC card, or the like. The detector 90B is a reader that reads the RF tag Tg. In this configuration, the controller 70 is able to wirelessly transmit an RF signal detected by the detector 90B from the communicator 30 to the industrial machine 200 as identification information.

RF tags Tg may be disposed in reference positions. For example, RF tags Tg may be disposed in a first position P1, a second position P2, and a third position P3 of the industrial machine 200, as well as in positions that are taught to the loader 110 in teaching the loader. In this case, first, the loader chuck 112 of the loader 110 is located in the positions taught to the loader 110. Subsequently, the operation terminal 100B is brought close to an RF tag Tg placed in each of these positions so that an RF signal is read by the detector 90B. The controller 70 transmits identification information based on the read RF signal to the industrial machine 200. On the basis of the received identification information, the position setter 131 of the industrial machine 200 sets the X, Z, and Y coordinates of the loader chuck 112 located in the respective teaching positions so as to be associated with the coordinates of the positions in which the RF tags Tg are placed. Thus, the operator is able to save the time and effort to move to the operation panel 140 after locating the loader chuck 112 in the teaching positions and then to register the coordinates.

As seen above, the operation terminal 100B is able to quickly and reliably transmit information, such as detection information based on an RF signal, different from information to operate the industrial machine 200 to the industrial machine 200. Also, the terminal body 10 is cordless or wireless and therefore the operator is able to freely move the terminal body 10 in accordance with the positions of the RF tags Tg and to cause it to read RF signals.

Figure 6A:
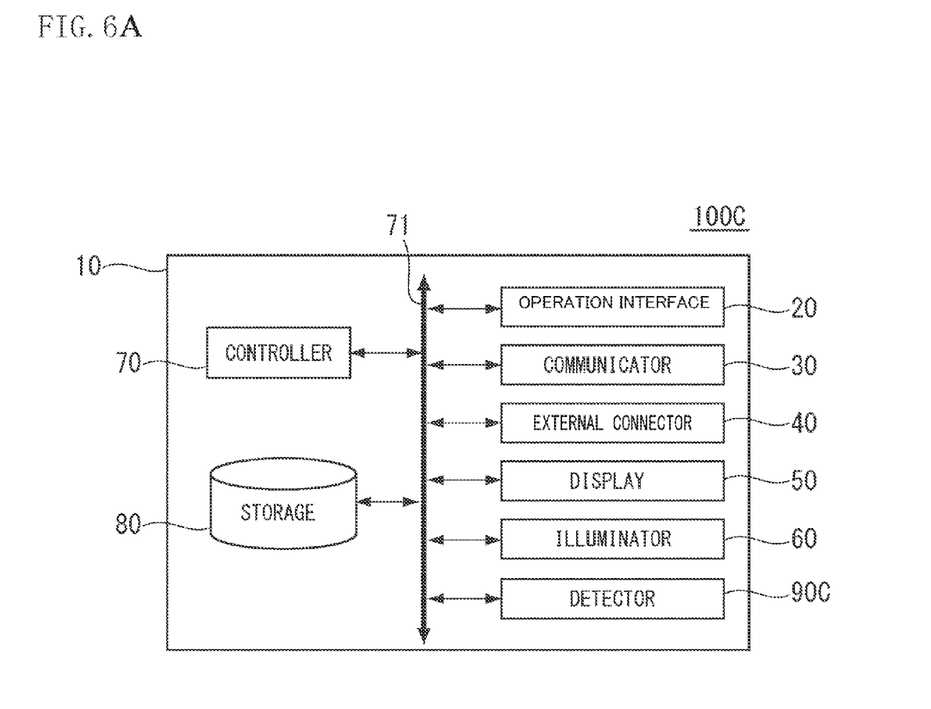
FIGS. 6A and 6B are diagrams showing another example of an operation terminal according to a modification of a preferred embodiment of the present invention.
Figure 6B:
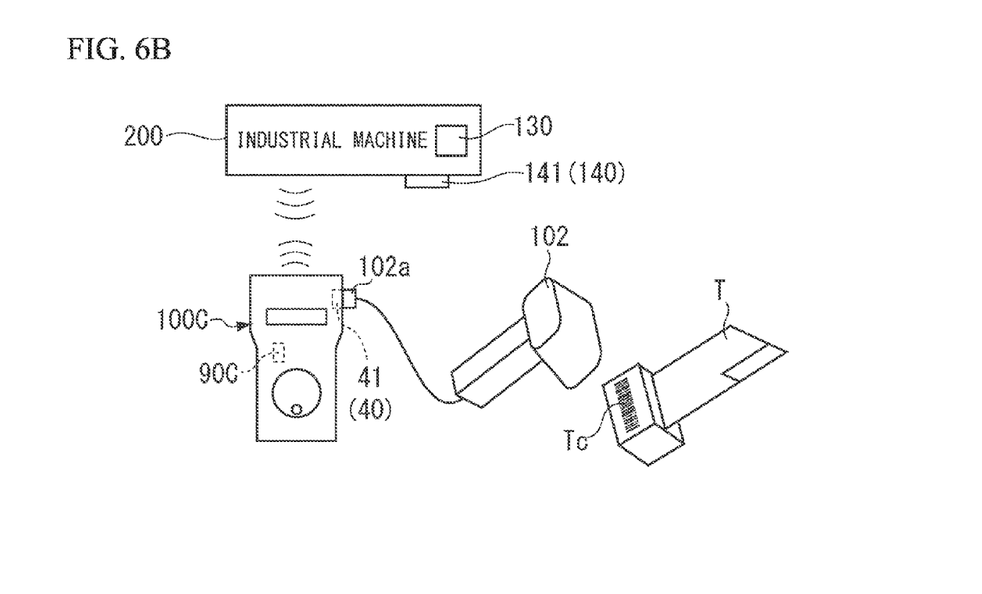

Next, yet another modification of a preferred embodiment of the present invention will be described. FIG. 6A is a block diagram showing an example of an operation terminal 100C. FIG. 6B is a diagram showing an example of the use aspect of the operation terminal 100C. As shown in FIG. 6A, in the present modification, a terminal body 10 of the operation terminal 100C is provided with an operation interface 20, a communicator 30, an external connector 40, a display 50, an illuminator 60, a controller 70, and a storage 80, as well as a detector 90C. The appearance of the operation terminal 100C is approximately the same as the operation terminal 100 shown in FIG. 1A and therefore is not illustrated. The present modification will be described below using, as an example, an industrial machine 200 that includes the loader 110, machine tool 120, controller 130, and operation panel 140 described above.

The detector 90C detects code information about a code, such as a barcode or two-dimensional code, which serves as an identifier. As shown in FIG. 6B, a connection terminal 102a of a code detector 102, such as a barcode scanner or two-dimensional scanner, is inserted into an external connector 40 (connector 41) of the operation terminal 100C. FIG. 6B shows a case in which the code detector 102 detects a barcode (identifier) Tc attached to a cutting tool T. For example, the cutting tool T is used to cut the workpiece W in the industrial machine 200 of the above preferred embodiment. The barcode Tc includes information used to manage the cutting tool T, such as the usage count or type of the cutting tool T.

In this case, the code detector 102 detects the barcode Tc, as well as inputs detection data of the detected barcode Tc to the external connector 40 (connector 41) of the operation terminal 100C. The detector 90C detects code information from the detection data inputted. The controller 70 controls the communicator 30 so that the communicator 30 transmits the code information detected by the detector 90C to the industrial machine 200.

In the industrial machine 200, the controller 130 detects information about the cutting tool T on the basis of the code information received. The controller 130 may display the usage count, type, or the like of the cutting tool T on the display 141 of the operation panel 140, or the like on the basis of the information detected. In this case, it is possible to easily manage the usage count, type, or the like of the cutting tool T.

A barcode indicating information about the shape, size, or the like of the workpiece W may be attached to the workpiece W. In this case, in the industrial machine 200, the controller 130 detects information about the workpiece W, which is to be machined, on the basis of code information received from the operation terminal 100C. The controller 130 is able to perform control by changing the machining program, the pattern of the tool shift, the number of products, or the like in accordance with the information detected.

The operator may detect a barcode using the code detector 102, for example, when a start-up inspection is performed. Also, the operator need not detect a barcode using the code detector 102 and, for example, may capture an image of a barcode using the image capture device 101. In this case, the controller 70 transmits image information of the barcode to the industrial machine 200 through the communicator 30. The industrial machine 200 reads code information on the basis of the image information of the barcode and detects information about the cutting tool T, workpiece W, or the like on the basis of the code information. Also, the operation terminal 100C may be provided with the function of the code detector 102.

As seen above, the operation terminal 100C includes the detector 90C that detects code information and thus is able to transmit code information, such as a barcode or two-dimensional code, to the industrial machine 200. By attaching a barcode or the like to the cutting tool T or workpiece W in advance and transmitting code information of the barcode from the operation terminal 100C to the industrial machine 200, the industrial machine 200 is able to more efficiently perform the management or the like of the machining or the like of the cutting tool T or workpiece W using the code information.

Next, still yet another modification of a preferred embodiment of the present invention will be described. While the case in which operations are performed using the operation terminal 100 has been described above, the operation terminal 100 may be used in other ways. For example, the operation terminal 100 itself may be used as a storage medium. In this case, the operation terminal 100 is able to receive and pass information by storing predetermined information in the storage 80 thereof and wirelessly transmitting the predetermined information. The predetermined information need not always be stored in the storage 80 and, for example, may be stored in a memory card or the like inserted into the card slot 42.

Figure 7A:
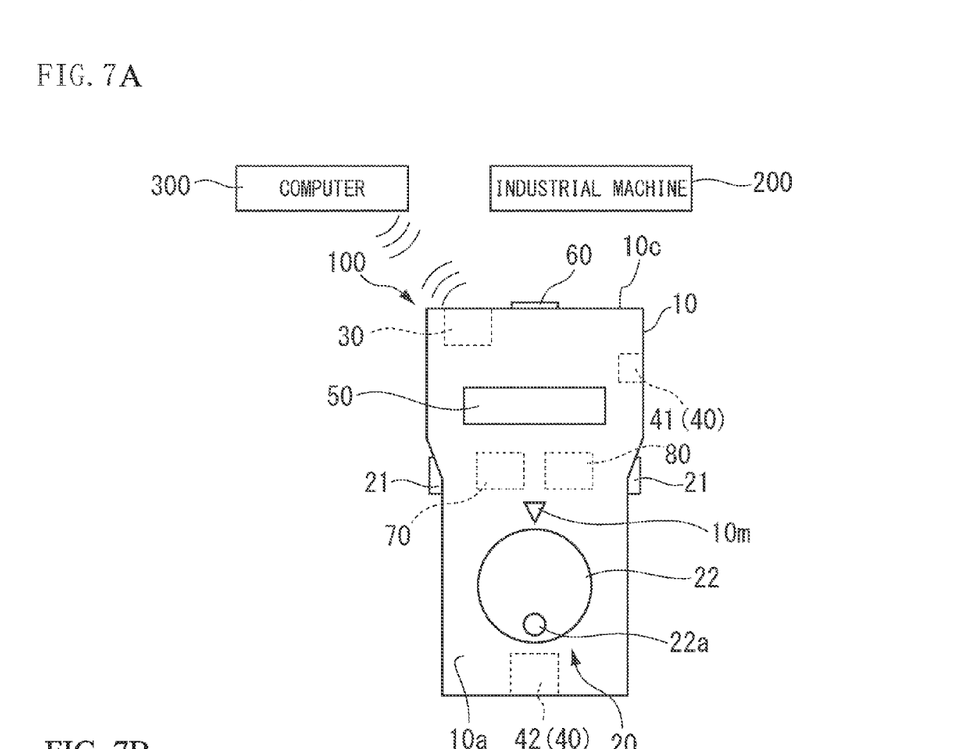
FIGS. 7A and 7B are diagrams showing another example of an operation terminal according to a modification of a preferred embodiment of the present invention.
Figure 7B:
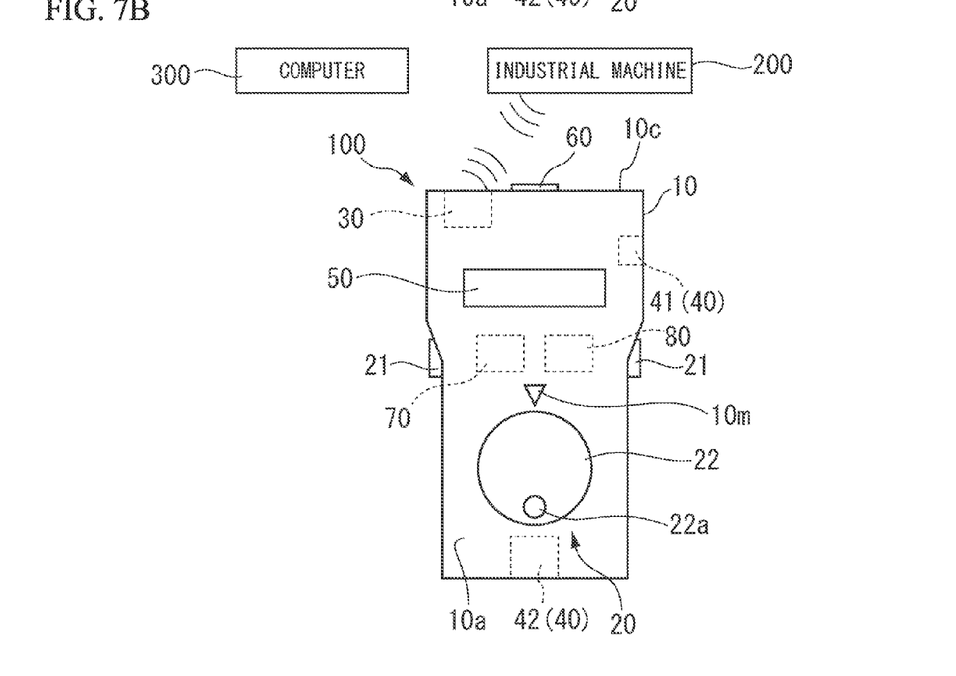

Examples of the predetermined information stored in the storage 80 or memory card include a program to machine the workpiece W. Hereafter, a case in which information, such a machining program, stored in a computer 300 of a management center that manages the industrial machine 200 is uploaded to the industrial machine 200 will be described as an example of the use aspect of the operation terminal 100. FIGS. 7A and 7B are diagrams showing an example of the use aspect of the operation terminal 100.

First, the operator moves to the management center with the operation terminal 100 and, as shown in FIG. 7A, causes the operation terminal 100 to wirelessly communicate with the computer 300. The operator then causes the computer 300 to wirelessly transmit information, such as the machining program, to the operation terminal 100. This information is received through the communicator 30 and stored in the storage 80. If the management center is provided with multiple computers, the controller 70 is able to control the connection destination in wireless communication by causing each computer to perform authentication using a password or the like. The information of the computer 300 may be stored in the storage 80 by wire. Also, information may be received and passed by inserting a memory card into the computer 300 to store the information in the memory card and then inserting the memory card into the card slot 42 of the operation terminal 100.

The operator then carries the operation terminal 100 to near the industrial machine 200 and starts the operation terminal 100. As shown in FIG. 7B, when the controller 70 recognizes the industrial machine 200 as the connection destination in wireless communication, it changes the setting of the connection destination from the computer 300 to the industrial machine 200 and causes the operation terminal 100 to wirelessly communicate with the industrial machine 200. The connection destination in wireless communication may be changed on the basis of an operation of the operation terminal 100 by the operator.

Then the controller 70 causes the operation terminal 100 to transmit the information, such as the machining program, stored in the storage 80 to the industrial machine 200, on the basis of an operation made by the operator. In the industrial machine 200, the controller 130 controls the operation of the loader 110, machine tool 120, or the like on the basis of the received information, such as the machining program.

As seen above, the operation terminal 100 is able to wirelessly communicate large-size information and thus can be used as a storage medium. Carrying a storage medium, such as a USB memory, in a factory or the like in which the industrial machine 200 is installed is restricted in some cases. For example, if the reception and passage of information or the like required to operate the industrial machine 200 are restricted, it may be inconvenient. In the present modification, on the other hand, the operation terminal 100 is able to easily receive and pass such information and therefore the convenience of the industrial machine system is increased.

The technical scope of the present invention is not limited to the above preferred embodiments and modifications, and changes can be made to the preferred embodiments and modifications as appropriate without departing from the spirit of the present invention.

While the industrial machine 200 including the loader 110, machine tool 120, controller 130, and operation panel 140 has been described as an example, the industrial machine may be configured otherwise. For example, the industrial machine may consist of the loader 110 alone or the machine tool 120 alone. Further, the industrial machine 200 is not limited to these configurations and may be other types of industrial machines, such as a robot.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A machine tool system comprising:
    a machine tool that machines a workpiece;
    a loader that carries the workpiece in and out of the machine tool by moving a workpiece support that supports the workpiece;
    an identifier disposed at a reference position of the machine tool to which the workpiece support is able to move;
    a portable operation terminal that is able to operate at least one of the machine tool and the loader by wireless communication, includes a detector that detects identification information of the identifier including the reference position of the machine tool at which the identifier is disposed, and a communicator that transmits the identification information of the identifier detected by the detector; and
    a controller that defines and functions as a position setter that sets a stop position or a passage position of the workpiece support based on position information of the workpiece support recognized based on the identification information of the identifier transmitted from the communicator.

2. The machine tool system according to claim 1, wherein the identifier is a radio frequency tag;

the detector detects a radio frequency signal from the radio frequency tag; and the identification information of the identifier is based on the radio frequency signal detected by the detector.

* * * * *